United States Patent [19]

Suhren et al.

[11] 3,927,349

[45] Dec. 16, 1975

[54] ZERO CROSSING SCR LIGHT DIMMER

[75] Inventors: Glen D. Suhren, Dallas; Charles W. True, III, Garland, both of Tex.

[73] Assignee: The United States of America as represented by the Secretary of the Air Force, Washington, D.C.

[22] Filed: Apr. 11, 1974

[21] Appl. No.: 460,230

[52] U.S. Cl........ 315/205; 307/252 UA; 315/DIG. 4
[51] Int. Cl.² .......................................... H05B 37/00
[58] Field of Search..... 307/252 N, 252 Q, 252 UA; 315/DIG. 4, 205

[56] References Cited
UNITED STATES PATENTS

| | | |
|---|---|---|
| 3,265,907 | 9/1966 | Kurata et al. .................. 315/DIG. 4 |
| 3,684,919 | 8/1972 | Cramer .......................... 315/DIG. 4 |
| 3,766,409 | 9/1973 | Shuey ............................ 307/252 N |

Primary Examiner—R. V. Rolinec
Assistant Examiner—Lawrence J. Dahl
Attorney, Agent, or Firm—Joseph E. Rusz; William Stepanishen

[57] ABSTRACT

A SCR light dimmer apparatus to control the brilliance of high wattage incandescent lamps from a 400 Hz supply without generating any substantial amount of radio interference.

11 Claims, 2 Drawing Figures

3,927,349

ZERO CROSSING SCR LIGHT DIMMER

BACKGROUND OF THE INVENTION

The present invention relates broadly to a light dimmer apparatus, and in particular to a SCR light dimmer apparatus utilizing zero crossing silicon rectifiers to control the power to the lamp without producing objectionable flicker.

A dimmer control for a high voltage incandescent lamp should control the voltage to the lamp without producing excessive radio frequency interference (RF) and still be efficient. There are several types of dimmers used which are efficient but produce various levels of RFI. These are the variable transformer, saturable reactor, and the electronic SCR control.

The variable transformer adjusts the brightness of the lamp by changing the voltage amplitude to the lamp by moving a tap along the windings of an auto-transformer. This type of control has the high efficiency of a transformer and since the sine waveform is undistorted little RFI is generated. Unfortunately, the variable transformer is heavy and bulky and must be remotely mounted from a control panel in many applications. If it is remotely controlled, a motor must be used to mechanically turn the wiper arm. Since the variable transformer is an electro-mechanical device, it does not lend itself to today's all electronic system.

The second type of dimmer is the saturable reactor or magnetic amplifier. It is capable of controlling large levels of A.C. power with a small D.C. control voltage, thus lending itself to remote and electronic control. The saturable reactor controls the brightness of the lamp by applying power to the bulb for only a certain length of the A.C. cycle. The chief disadvantage of the saturable reactor is the excessive RFI which is generated by the fast switching from the off state to the high power on state. Although filters may be utilized to reduce this interference, the size and cost of the filters becomes excessive, especially in attempting to reduce interference in the low end of the radio frequency spectrum.

The third type of control is the silicon controlled rectifier or SCR. There are two types of SCR power controllers, the phase controlled SCR and the zero crossing SCR. The phase controlled SCR varies the brilliance of the lamp by turning the SCR from the off state to the on state during different phases or times of the cycle much like the saturable reactor. The turn on point can be easily controlled and this technique works well with remote control and electronic systems. However, the phase controlled SCR suffers the same RFI problems as the saturate reactor.

A solution for the RFI problem of the phase controlled SCR is to turn the SCR on or off only as the cycle passes through zero which will eliminate the RFI problems since the waveform remains an undistorted sine wave. This type of control is called zero crossing switching or synchronous switching. The brilliance of a lamp may be controlled by removing a certain number of cycle of power over a time period. This technique is called time proportional control and is commonly used for controlling the temperature of heater. In trying to apply time proportional control to a light dimmer several problems arise. Since power must be applied in steps or cycles, the brilliance of the lamp will change in steps. If the number of steps could be increased, the zero crossing SCR would make a noise free all electronic control for incandescent lamps. Unfortunately, the greater the number of steps, the greater the tendency the lamp will flicker. The zero crossing SCR is suggested only for use in controlling heater; however, this present invention provides the apparatus to make a useful zero crossing SCR dimmer for controlling high power lamps from a 400 Hz source.

SUMMARY

The present invention utilizes zero crossing SCR devices to provide a light dimmer apparatus for controlling high power lamps from a 400 Hz source. The zero crossing SCR light dimmer apparatus varies the average power to the lamp by changing the on-off duty cycle. In addition, the number of discrete steps or cycles are increased to make the step to step change in the application of power to the lamp less noticeably, thereby reducing the flicker factor. This is accomplished by controlling the positive half cycle and the negative half cycle separately from each other.

It is one object of the invention, therefore, to provide an improved SCR light dimmer apparatus to control the brightness of an incandescent lamp.

It is another object of the invention to provide an improved SCR light dimmer apparatus to vary the average power to the lamp by changing the on-off duty cycle.

It is yet another object of the invention to provide an improved SCR light dimmer apparatus to reduce the lamp flicker factor by controlling the positive and negative half cycles separately.

These and other advantages, features and objects of the invention will become more apparent from the following description taken in connection with the illustrative embodiment in the accompanying drawings.

DESCRIPTION OF THE PREFERRED EMBODIMENT

Figure 1:
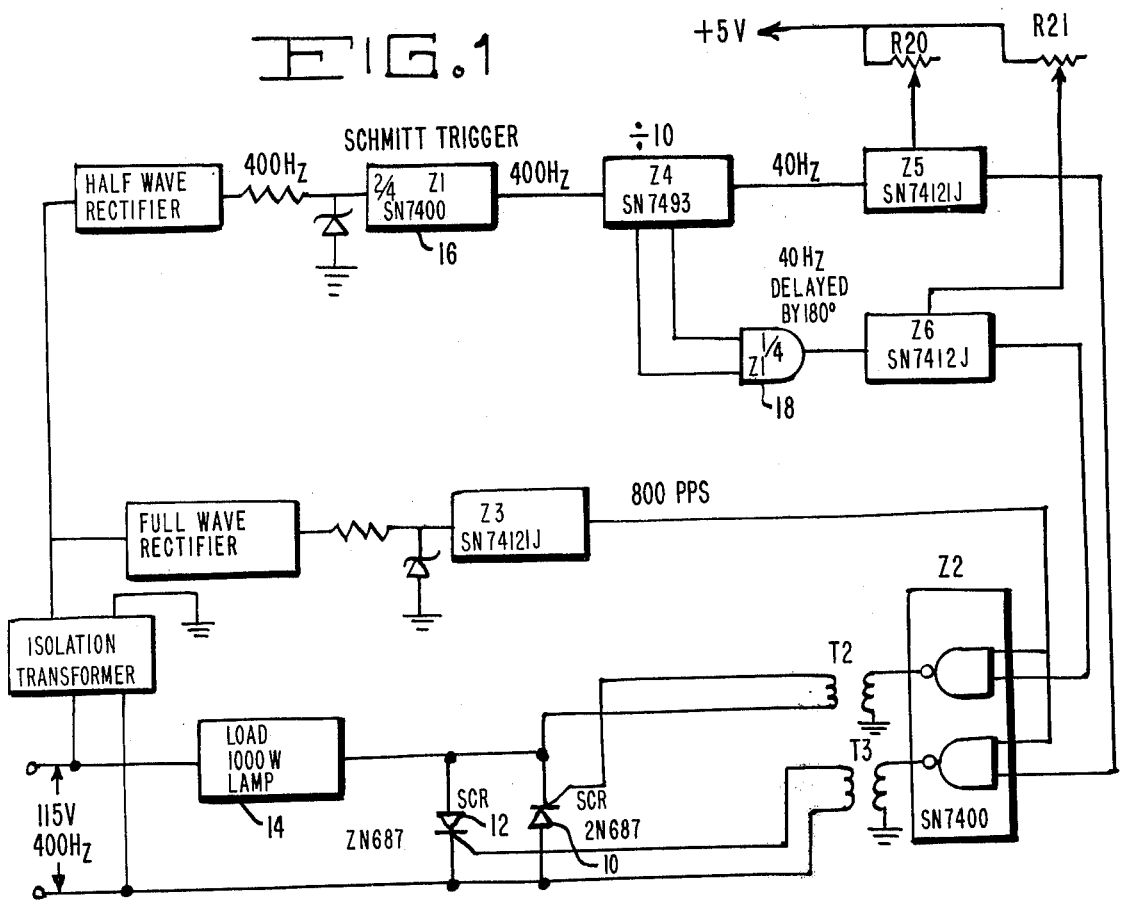
FIG. 1 is block diagram of the SCR light dimmer apparatus in accordance with the present invention, and, FIG. 2 is a graphical representation of the waveforms which are utilized within the SCR light dimmer apparatus.

The brightness of an incandescent lamp which is operating from 400 Hz power source may be controlled by a zero crossing SCR time proportional control apparatus, much the same as the temperature of an electrical heater is controlled. This time proportional control method varies the average power to the load (the lamp) by changing the on-off duty cycle, thus providing controlled burst of complete cycles to the load. Since the power can only be applied in discrete steps or cycles, the brilliance of the lamp will also change in discrete steps. If the number of steps can be increased to make the step to step change of brilliance less noticeable, the zero crossing SCR would make an interference free all electronic dimmer for high wattage incandescent lamps. However, as the number of steps or cycles is increased, the tendency of the lamp to flicker also increases. As was earlier mentioned, a zero crossing switching apparatus controls the brilliance of a lamp by removing a predetermined number of cycles of power over the given time period. This technique which is commonly utilized for controlling the temperature of an electrical heater, is also time proportional control.

Therefore, the waveform to the lamp with time proportional control would involve having only a cycle or two at the beginning of the given time period. Thus, the amount of power which is delivered to the lamp, will be relatively low.

Although the average power which is delivered to a lamp utilizing a time proportional apparatus is small, the peak power that is delivered to the lamp during the time the lamp is on is relatively high. The brilliance of the lamp will fluctuate as the lamp cools during the long off time which is the remainder of the given time period. This fluctuation will be particularly noticeable as flicker depending upon the applied frequency rate and the change in intensity of brightness. Tests were conducted utilizing a time proportional control apparatus and a 1,000 watt projection lamp as the load. The results which were obtained produced very noticeable flicker, especially at low power levels with a fundamental repetition rate of 50 Hz. With this repetition rate, the number of steps in brilliance changes will be only 8 from full brilliance to off.

The present invention provides a zero crossing SCR light dimmer apparatus which increases the number of steps that are applied to the lamp by controlling the positive half cycle separately from the negative half cycle. This would effectively double the number of steps without increasing the flicker problem. The visible flicker may be further minimized by increasing the flicker frequency and thus applying the power to the lamp more evenly during the given repetition time period. This is accomplished by delaying the negative half cycle by approximately 180° in phase of the fundamental repetition rate from the positive half cycle. This technique effectively doubles the flicker frequency for all but the last half cycle of power, thereby reducing flicker.

Turning now to FIG. 1, there is shown a block diagram of the zero crossing SCR light dimmer apparatus utilizing SCR diodes 10, 12 to control the illumination of lamp 14. The circuit herein shown is a 20 step circuit which was designed to operate with a 400 Hz supple and a 1,000 watt incandescent projection lamp 14. A Schmitt trigger 16 which comprises two NAND gates of Z1, squares the 400 Hz line frequency and drives a decade counter Z4 which produces the two output 40 Hz synchronization signal. One of the two 40 Hz signals comes from pin 8 of the SN7493J counter while the other signal comes from the output of a NAND gate 18. The output of the NAND gate 18 is a 40 Hz signal which is delayed by approximately 180° in phase of the fundamental repetition rate from the first 40 Hz signal.

Figure 2:
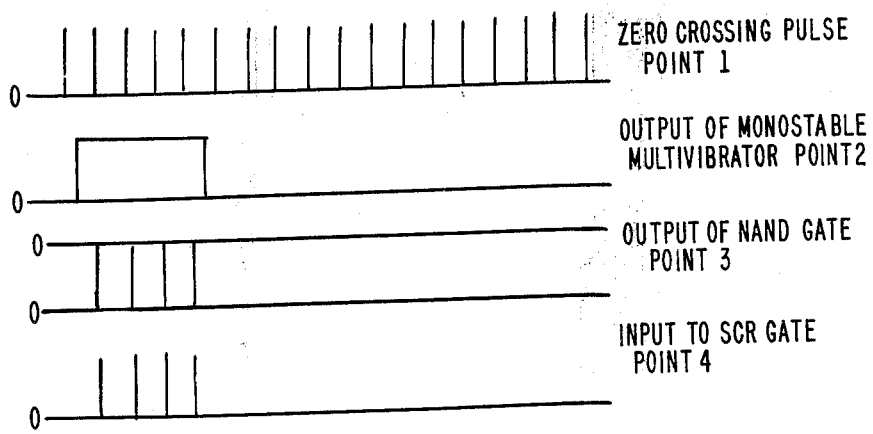

These two separate 40 Hz signals trigger two separate monostable multivibrators Z5 and Z6, one for positive half cycle control, the other for negative half cycle control. The output of the two separate multivibrators have a rate of 40 Hz and a variable pulse width by adjusting R20 and R21. Each output of the multivibrators 25, 26 drive one input of two separate NAND gates of Z2. Driving the other inputs of the NAND gates is a zero crossing pulse which is produced by monostable multivibrator Z3 every time the line voltage passes through zero. The key to the dimmer circuit is the logic performed by the two NAND gates of Z2 and transformers T2 and T3. Since both half cycle control circuits are identical only one will be discussed. The lotic which is performed by Z2, T2, and T3 is shown in FIG. 2 wherein the designations (1) through (4) describe the signals which appeared at the corresponding labelled points in FIG. 1.

There will be a logical "0" output from the NAND gate in unit 22 only if both the zero crossing pulse and the output of the multivibrators 25, 26 is the logical "1" level. By reversing the windings on the pulse transformer there will be a pulse to turn the SCR on only at the zero crossing point and only for the pulse width of the monostable multivibrator. Once the SCR is turned on, it will continue to conduct until the line voltage passes through zero. By varying the resistance of R20 and R21, the number of half cycles of power which are applied to the load, incandescent lamp, can be controlled.

The circuit which was described above was built and tested with a 1,000 watt incandescent lamp that was powered by a 400 Hz supply. Initially tests were run on the above circuit without a delay in control on negative and positive half cycles. The repetition rate was also changed to 50 Hz by changing the counter to a divide-by-12 circuit. The 12-step circuit produced objectionable flicker throughout most of its range without the delay in control on the positive and negative half cycles. Once the positive and negative half cycles were delayed by 180° and the counter was changed to a divide-by-10, the 20-step circuit which was described above produced 19 steps of flicker free control. For the last half cycle of power, flicker was noticeable due to the lower repetition rate of 40 Hz instead of 80 Hz. The step to step change was substantially unnoticeable for the first 10 steps, but began to become more apparent with reducing power. This effect is due to the increasing percentage change in power with each step, with decreasing power.

The ganged potentiometer which is used for R20 and R21 may be replaced by a multiposition switch. This allows the changing of the monostable multivibrator pulse widths in discrete steps, preventing the possibility of the multivibrators having changed states at the time of the zero crossing pulse, and thus producing random keying of the SCR devices 10, 12.

The component and logic devices which are utilized in the present invention are conventional commercially available items or are circuits and components which are well known to those skilled in the art. The commercially available components are obtainable from vending sources under the standard part numbers which are included for the component in the drawing.

Although the invention has been described with reference to a particular embodiment, it will be understood to those skilled in the art that the invention is capable of a variety of alternative embodiments within the spirit and scope of the appended claims.

What is claimed is:

1. A zero crossing SCR light dimmer apparatus comprising in combination:

a power source connected to a high wattage lamp to supply power thereto, said power source having a frequency of 400 Hz, said lamp having a parallel pair of silicon controlled rectifiers in series with said power source, said silicon controlled rectifiers being connected in opposite directions, one of said silicon controlled rectifiers being a positive SCR and the other a negative SCR, means for controlling the positive half cycles of power being connected to said positive SCR, said positive controlling means turning said positive SCR on at a predetermined time, means for controlling the negative half cycles of power being connected to said negative SCR, said negative controlling means turning said negative SCR on at a predetermined time, means for synchronizing the application of power from said positive and negative controlling means connected to said positive and negative controlling means, said synchronizing means providing a synchronizing signal to said positive and negative controlling means, and, a control unit connected to said positive and negative controlling means, said control unit providing a control signal to said positive and negative controlling means, said positive and negative controlling means respectively providing a positive half cycle of power and a negative half cycle of power when said synchronizing signal and said control signal coincide.

2. A zero crossing SCR light dimmer apparatus as described in claim 1 wherein said positive controlling means comprises in combination:

an NAND gate to receive said synchronizing signal and said control signal, said NAND gate providing an output signal when said control and synchronizing signals are both logical one, and, a pulse transformer connected to said NAND gate to receive said output signal, said pulse transformer applying said output signal to said positive SCR, said positive SCR being turned on for the length of the pulse width of said control output signal.

3. A zero crossing SCR light dimmer apparatus as described in claim 1 wherein said negative controlling means comprises in combination:

an NAND gate to receive said synchronizing signal and said control signal, said NAND gate providing an output signal when said control and synchronizing signals are both logical one, and a pulse transformer connected to said NAND gate to receive said output signal, said pulse transformer applying said output signal to said negative SCR, said negative SCR being turned on for the length of the pulse width of said control output signal.

4. A zero crossing SCR light dimmer apparatus as described in claim 1 wherein said control unit comprises in combination:

a full-wave rectifier unit connected to said power source to receive said 400 Hz frequency, said full-wave rectifier providing an output frequency of 800 Hz, A pulse shaper connected to said full-wave rectifier to receive said 800 Hz, said pulse shaper shaping said 800 Hz into an 800 Hz pulse train, and a pulse generator to receive said 800 Hz pulse train, said pulse generator providing output pulses, said output pulses having a frequency of 800 pulses per second.

5. A zero crossing SCR light dimmer apparatus as described in claim 1 wherein said control signal comprises a series of zero crossing pulses.

6. A zero crossing SCR light dimmer apparatus as described in claim 4 wherein said synchronizing means comprises in combination:

a half-wave rectifier connected to said power source to receive said 400 Hz frequency, said half-wave rectifier rectifying only the positive half cycle of said 400 Hz frequency, a pulse shaper to receive said rectified 400 Hz frequency, said pulse shaper shaping said rectified 400 Hz frequency to provide a 400 Hz pulse train, a Schmitt trigger to receive said 400 Hz pulse train, said Schmitt trigger providing output pulses having a frequency of 400 Hz, a counter connected to said Schmitt trigger to receive said output pulses, said counter dividing said output pulses by a predetermined number, said counter providing a first and second counter output signal, and a first and second monostable multivibrator to receive said first and second counter signal respectively, said first and second monostable multivibrator providing synchronizing signals respectively in response to said first and second counter signals, said first monostable multivibrator providing said synchronizing signal to said positive controlling means, said second monostable multivibrator providing said synchronizing signals to said negative controlling means.

7. A zero crossing SCR light dimmer as described in claim 6 wherein said predetermined number is 10, said counter thus providing division by 10.

8. A zero crossing SCR light dimmer apparatus as described in claim 6 wherein said second counter signal is delayed by 180°.

9. A zero crossing SCR light dimmer apparatus as described in claim 6 wherein said first and second counter signals have a frequency of 40 Hz.

10. A zero crossing SCR light dimmer apparatus as described in claim 6 wherein said first and second monostable multivibrator have variable pulse widths, said variable pulse widths providing a means to vary the number of half cycles of power to both said positive and negative controlling means.

11. A zero crossing SCR light dimmer apparatus as described in claim 8 wherein first and second monostable multivibrator have variable pulse widths, said variable pulse widths providing the means to vary the number of half cycles of power to both said positive and negative controlling means.

* * * * *